(12) United States Patent
Haaparanta et al.

(10) Patent No.: US 8,311,531 B2
(45) Date of Patent: Nov. 13, 2012

(54) METHODS, APPARATUSES AND COMPUTER PROGRAM PRODUCTS FOR AUTOMATICALLY SAVING INFORMATION ASSOCIATED WITH ONE OR MORE UNKNOWN CONTACTS

(75) Inventors: Juhani Haaparanta, Tampere (FI); Johanna Tiitola, Helsinki (FI)

(73) Assignee: Nokia Corporation, Espoo (FI)

( * ) Notice: Subject to any disclaimer, the term of this patent is extended or adjusted under 35 U.S.C. 154(b) by 384 days.

(21) Appl. No.: 12/645,932

(22) Filed: Dec. 23, 2009

(65) Prior Publication Data

US 2011/0151850 A1    Jun. 23, 2011

(51) Int. Cl.
   *H04M 3/00*    (2006.01)
(52) U.S. Cl. .................. 455/418; 455/550.1; 455/412.1; 379/201.01
(58) Field of Classification Search .................. 455/418, 455/550.1, 412.1; 379/201.01
See application file for complete search history.

(56) References Cited

U.S. PATENT DOCUMENTS

| | | | |
|---|---|---|---|
| 7,412,049 B1 | 8/2008 | Koch | |
| 2004/0086101 A1 | 5/2004 | Katz | |
| 2006/0246874 A1 | 11/2006 | Sullivan | |
| 2009/0161845 A1 | 6/2009 | Adams et al. | |
| 2009/0197621 A1* | 8/2009 | Book | 455/457 |
| 2009/0296675 A1* | 12/2009 | Tenny et al. | 370/338 |

FOREIGN PATENT DOCUMENTS

WO    WO 2009/067356    5/2009

OTHER PUBLICATIONS

International Search Report and Written Opinion of the International Searching Authority dated Nov. 3, 2011 for corresponding Application No. PCT/IB2010/055339.

* cited by examiner

*Primary Examiner* — Danh Le
(74) *Attorney, Agent, or Firm* — Alston & Bird LLP

(57) ABSTRACT

An apparatus for generating information associated with an unknown contact(s) may include a processor and a memory storing executable computer program code that causes the apparatus to at least perform operations including determining if a communication identifier(s) is in contact data responsive to determining that a communication is based on the communication identifier. The computer program code may cause the apparatus to detect information relating to the communication identifier, which may include data indicating whether previous communications of the communication identifier are identified. The data includes details of the previous communications. The computer program code may cause the apparatus to provide the detected information to a display of the apparatus in response to initiation of an outgoing/incoming communication and may determine whether to complete initiation of the outgoing communication or ignore the incoming communication based on data of the previous communications. Corresponding computer program products and methods are also provided.

20 Claims, 8 Drawing Sheets

METHODS, APPARATUSES AND COMPUTER PROGRAM PRODUCTS FOR AUTOMATICALLY SAVING INFORMATION ASSOCIATED WITH ONE OR MORE UNKNOWN CONTACTS

TECHNOLOGICAL FIELD

Embodiments of the present invention relate generally to mobile terminal technology and, more particularly, relate to an apparatus, a method and computer program product for automatically saving information corresponding to a communication with an unknown contact(s).

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of convenience to users relates to the handling of incoming calls and communication messages that are received from one or more communication devices via one or more communication methods. The communication methods may enable a user of a communication device to communicate by telephone, email, instant messaging (IM), text messaging (also called short messaging service or SMS), multimedia messaging service (MMS), or any combination thereof.

In this regard, a user of a communication device may call or send a message to a user of another communication device such as for example a mobile terminal via any of the above-mentioned communication methods. Typically, the communication device recognizes if the received call or message is sent from a caller/sender that is identified in its contact list (e.g., phonebook) and in this regard a caller/sender's name is typically shown on a display of the communication device. However, in some instances, the communication device receiving (e.g., also referred to herein as recipient device) the call or message may not have the contact information associated with the caller/sender of the message saved in its contact list. As such, the contact information (e.g., a contact name) associated with the caller/sender may be unknown to the recipient device and the user of the recipient device may not know the originator of the call or the sender of the message.

Typically, when a call or message is received from an unknown sender, a communication device such as a mobile terminal saves the phone number, email address or username associated with the call or message and a date that the call or message was received. These calls or messages may be saved by the mobile terminal in a registry such as a call registry (which may include recent calls such as last dialed, received and missed calls), a message registry or the like. However, if the mobile terminal is reset, (e.g., removal of a battery from the mobile terminal) the data in the registry is typically removed from the mobile terminal.

At present, it is sometimes difficult for a user of a mobile terminal to recognize if calls or messages continue to be received from the same unknown sender(s) that the user has not yet saved or does not desire to save in a contact list of the mobile terminal. For instance, currently when a user receives a call or message from an unknown sender (e.g., a telemarketer) that the user does not wish to include in a contact list or phonebook of the mobile terminal, the user may save a contact name associated with the unknown sender as "Salesman No. 1" or "Do not Answer" or some other name indicating to the user that the call should not be answered or that the message should not be returned. However, manually adding undesired contact information to the contact list of the mobile terminal is oftentimes undesirable, because it is inefficient, time consuming and burdensome for users to take the time to save the undesired contact information and most users typically want to reserve the contact list for contact information that they really need or desire to be included in the contact list.

As such, it would be beneficial for the mobile terminal to automatically save information in addition to the phone number, email address or username of an unknown caller/sender as well as the date that the call or message was received so that the user of the mobile terminal may utilize the additional information to more readily and easily identify calls and messages received from the same unknown sender(s).

Additionally, it may be beneficial for the mobile terminal to automatically generate contact card information for the unknown senders which may be maintained separate from the mobile terminal's contact list. In this regard, the integrity of the mobile terminal's contact list may be preserved.

Accordingly, it may be desirable to provide a mechanism in which to automatically generate communication information which may indicate that a call or message received from an unknown sender is unwanted by a user. It also may be desirable to automatically create contact cards associated with information relating to one or more unknown senders and maintain the contact cards in a group separate from a main contact list (e.g., phonebook) of a communication device.

BRIEF SUMMARY

A method, apparatus and computer program product are therefore provided that enable users of communication devices to easily and efficiently determine whether to complete the initiation of an outgoing call/message or reject/ignore an incoming call/message by evaluating information that is provided to a display of a communication device. At least a portion of the information that may be provided to the display of the communication device in response to the initiation of the outgoing call/message or receipt of the incoming call/message may include data indicating one or more previous communications with a user of a communication device associated with a communication identifier (e.g., phone number). It should be pointed out that a communication identifier as referred to herein may include, but is not limited to, one or more phone numbers, email addresses, IM screen names, usernames, etc.

The information associated with the previous communications may specify details of the prior communications such as, for example, the date, time and duration of previous communications as well as the number of previous communications and any other suitable data. For example, the information may also include data indicating the possible mechanisms of communication by using the communication identifier. Examples of possible communication mechanisms include but are not limited to phone calls, video calls, short message service (SMS) messages, multimedia messaging service (MMS) messages, instant messages (IM), chat messages, social networking service messages and the like.

According to exemplary embodiments, when the user of the communication device initiates or receives a communication associated with a communication identifier (e.g., a phone number) that is not saved in a contact list (e.g., phonebook) of the communication device, the user may evaluate the previous communication information as well as additional data and be able to quickly determine if the contact corresponding to the communication identifier is associated with someone that the user desires to communication with. For instance, data associated with a prior communication indicated that a duration of a phone call was 3 seconds or less on a given date and time, the user will likely determine that the contact associated with the communication identifier is not someone that the user would like to communication with. On the other hand, if a prior communication is associated with data indicating that a duration of a phone call was 1 hr., the user may determine that the contact associated with the communication identifier is someone that the user would like to communicate with.

In instances, in which a communication associated with a communication identifier (e.g., phone number) corresponds to a first communication with communication devices of the exemplary embodiments, the exemplary embodiments may generate data specifying that there are no prior communications associated with the communication identifier. The information specifying that there is no prior communication associated with a communication identifier may also be provided to a display of the communication devices of the exemplary embodiments in response to initiation of an outgoing call/message or receipt of an incoming call/message.

The exemplary embodiments are also configured to automatically classify a communication identifier as an unwanted communication identifier without requiring a user to manually assign a name (e.g., "Do Not Answer") associated with the communication identifier and without requiring the user to save the name and the communication identifier to a contact list. In this regard, a user may be able to quickly determine that he/she does not desire to communicate with the contact associated with the communication identifier.

Moreover, the exemplary embodiments may also automatically generate contact information for communication identifiers that are not saved in contact lists of communication devices. The generated contact information may, but need not, be saved in a list that is separate from a primary contact list in order to preserve the integrity of the primary contact list, for example. Additionally, one or more contact cards may be automatically generated based on this saved contact information. The contact cards may contain information regarding previous communications associated with the communication identifier as well communication details such as a day, time and duration of a call/message and possible mechanisms of communication by using a communication identifier.

In one exemplary embodiment, a method for automatically generating information associated with one or more unknown contacts is provided. The method may include determining whether at least one communication identifier is included in contact data of an apparatus in response to determining that a communication is facilitated in part based on the communication identifier. The method may also include detecting information associated with the communication identifier. The detected information may include data indicating whether one or more previous communications associated with the communication identifier are identified. The data includes content specifying details of the previous communications. The method may also provide the detected information and the communication identifier to a display of an apparatus in response to initiation of an outgoing communication or receipt of an incoming communication and may determine whether to complete the initiation of the outgoing communication or ignore the received incoming communication based in part on the data associated with the previous communications.

In another exemplary embodiment, a computer program product for automatically generating information associated with one or more unknown contacts is provided. The computer program product includes at least one computer-readable storage medium having computer-executable program code instructions stored therein. The computer-executable program code instructions may include program code instructions for determining whether at least one communication identifier is included in contact data of an apparatus in response to determining that a communication is facilitated in part based on the communication identifier. The program code instructions may also detect information associated with the communication identifier. The detected information may include data indicating whether one or more previous communications associated with the communication identifier are identified. The data includes content specifying details of the previous communications. The program code instructions may also provide the detected information and the communication identifier to a display of an apparatus in response to initiation of an outgoing communication or receipt of an incoming communication and may determine whether to complete the initiation of the outgoing communication or ignore the received incoming communication based in part on the data associated with the previous communications.

In another exemplary embodiment, an apparatus for automatically generating information associated with one or more unknown contacts is provided. The apparatus may include a processor and a memory including computer program code. The memory and the computer program code are configured to, with the processor, cause the apparatus to at least perform operations including determining whether a communication identifier(s) is included in contact data of the apparatus in response to determining that a communication is facilitated in part based on the communication identifier. The memory and the computer program code are configured to, with the processor, cause the apparatus to detect information associated with the communication identifier. The detected information may include data indicating whether one or more previous communications associated with the communication identifier are identified. The data includes content specifying details of the previous communications. The memory and the computer program code are also configured to, with the processor, cause the apparatus to facilitate display of the detected information and the communication identifier in response to initiation of an outgoing communication or receipt of an incoming communication and may determine whether to complete the initiation of the outgoing communication or ignore the received incoming communication based in part on the data associated with the previous communications.

Embodiments of the invention may provide a user of a communication device an easy and efficient manner in which to determine whether to complete the initiation of a call/message or accept a call/message from an unknown contact that is associated with a communication identifier.

BRIEF DESCRIPTION OF THE SEVERAL VIEWS OF THE DRAWINGS

Figure 1:
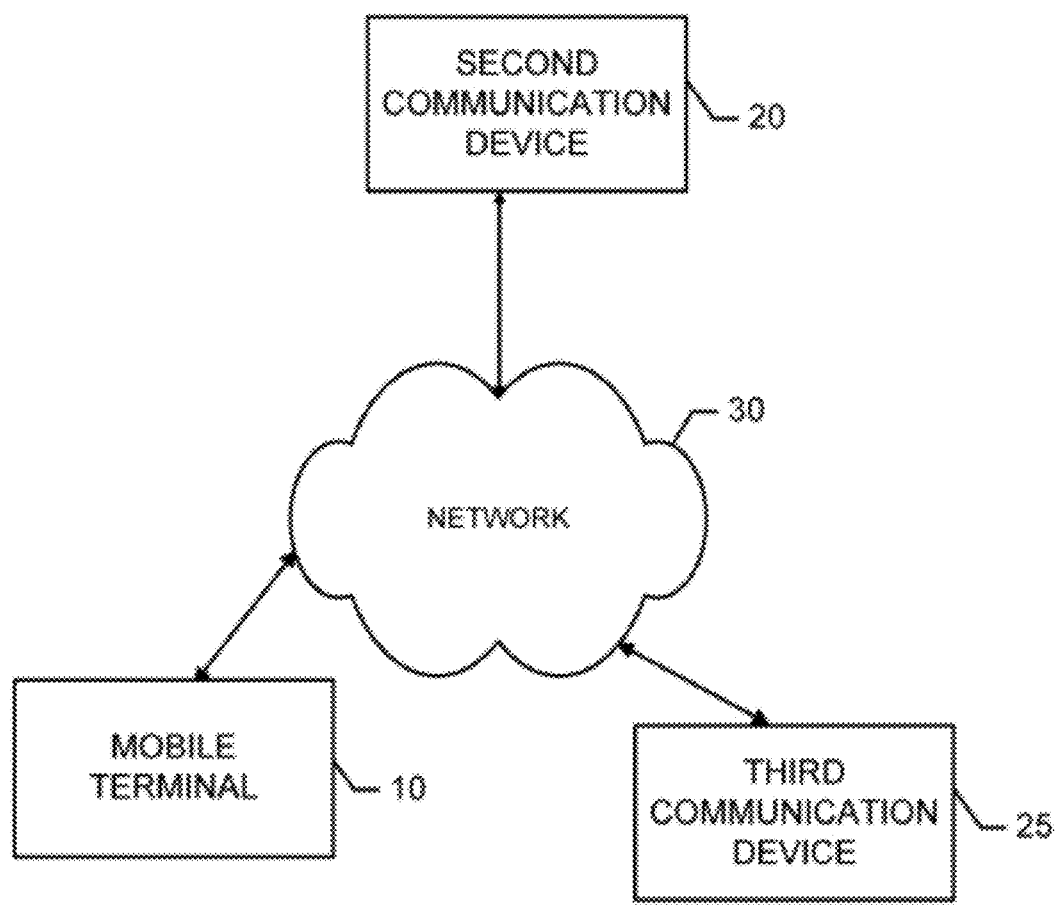
Figure 2:
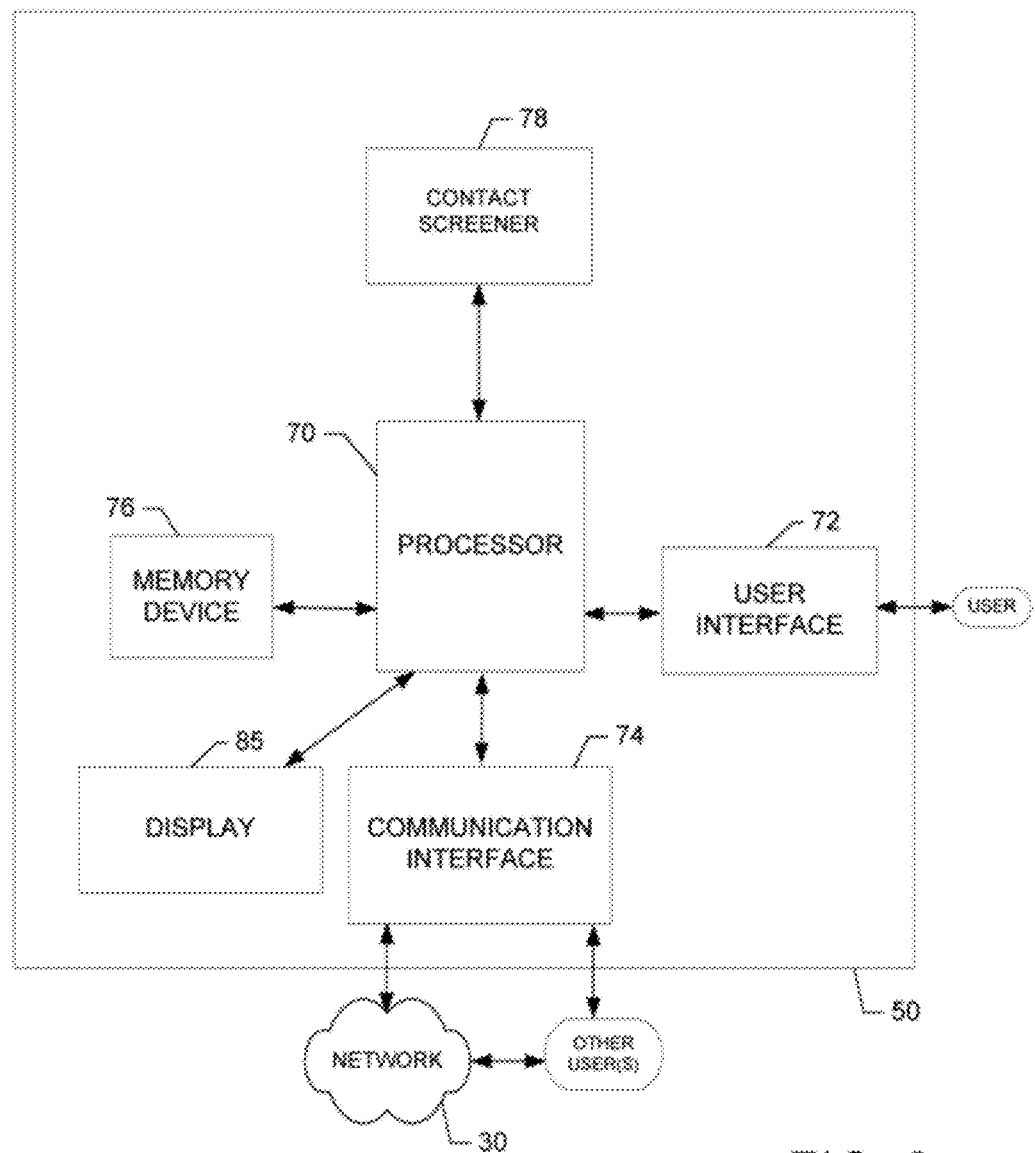
Figure 3:
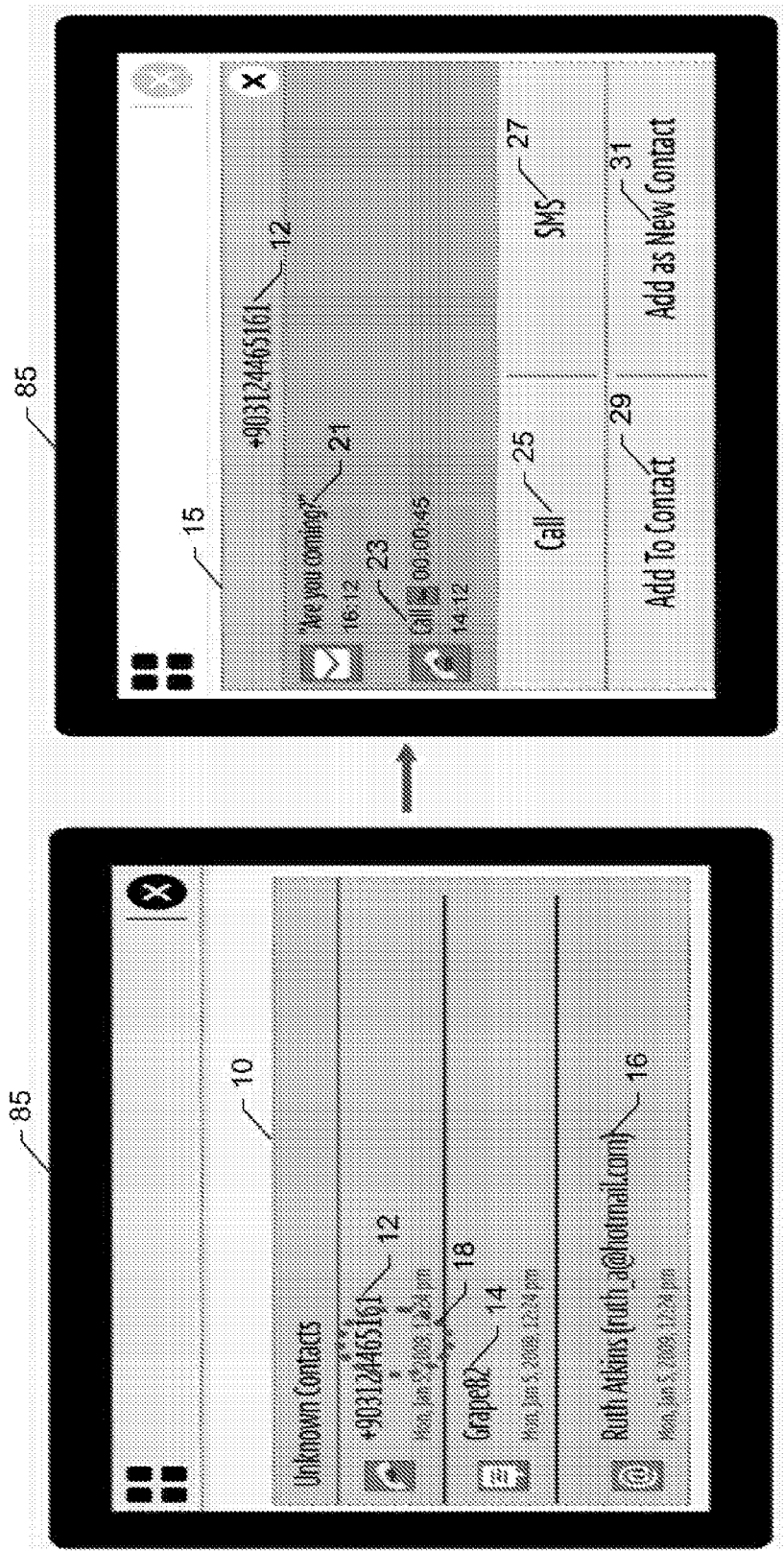
Figure 4:
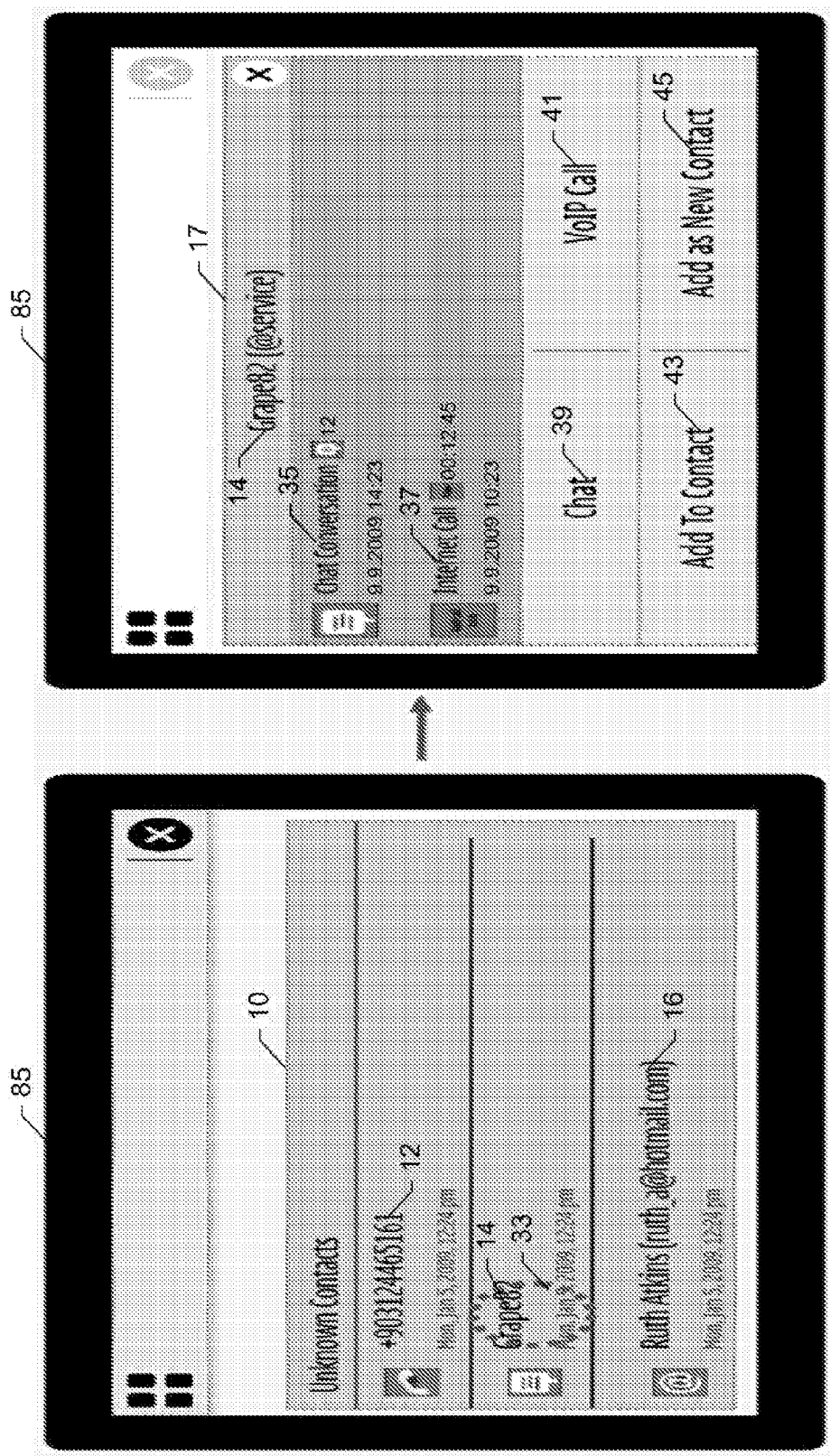
Figure 5:
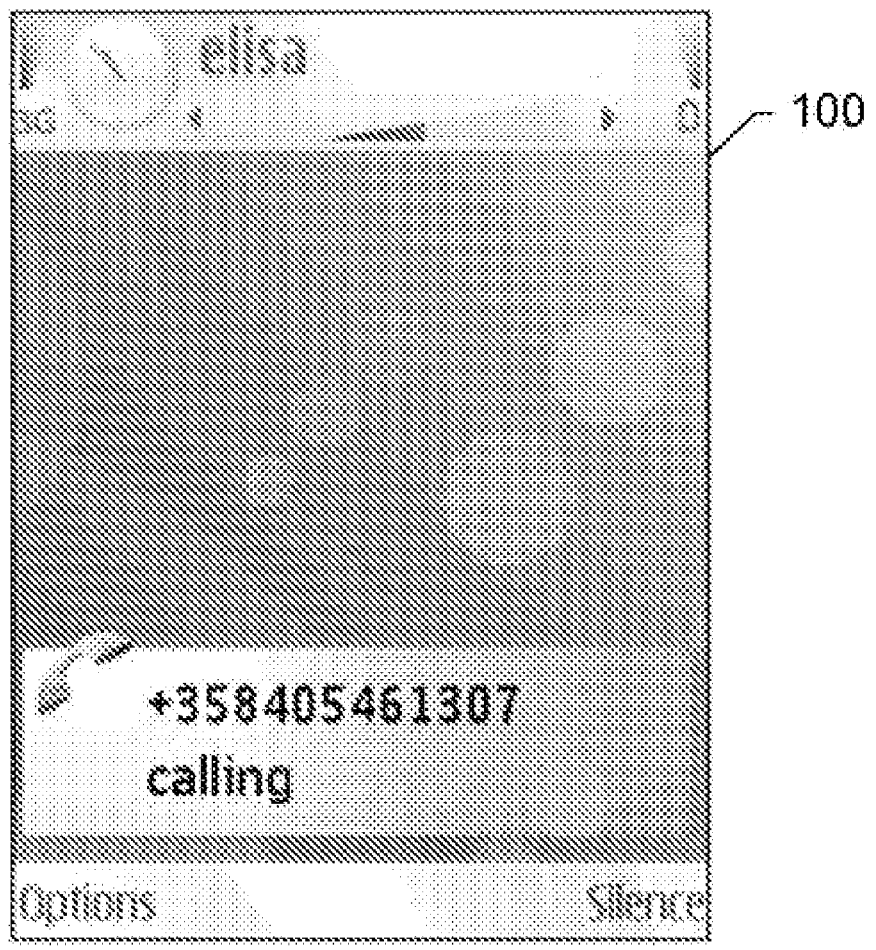
Figure 6:
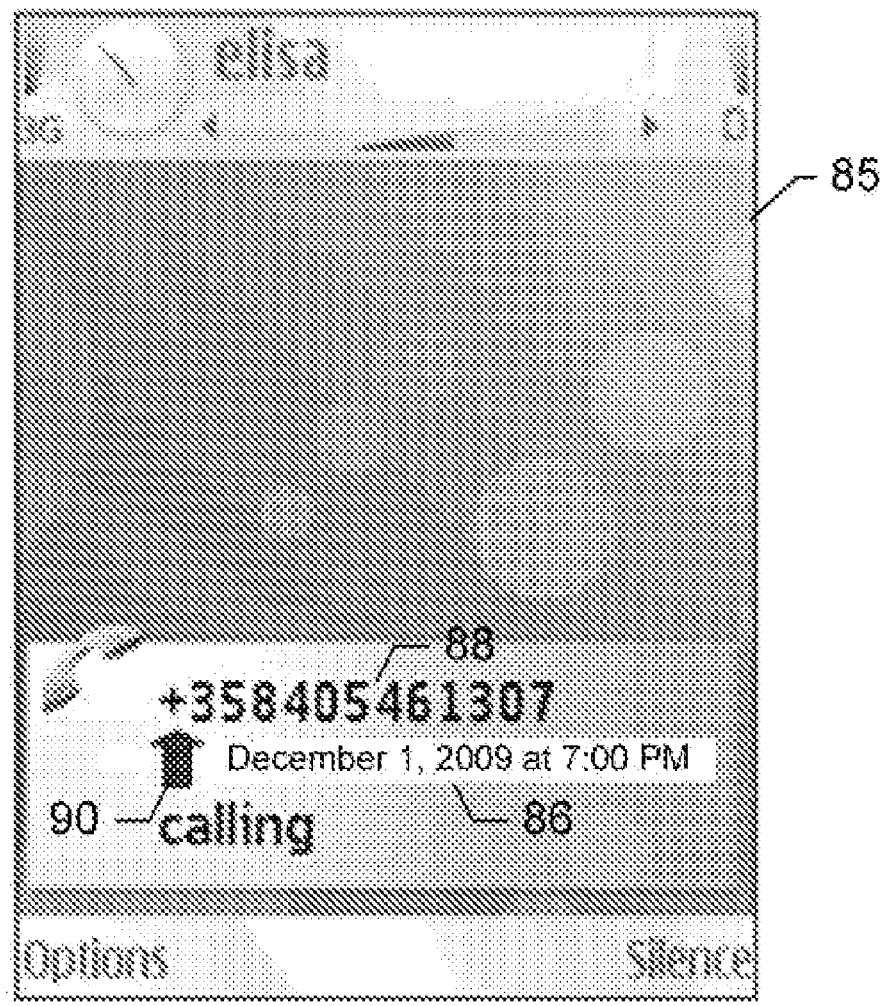
Figure 7:
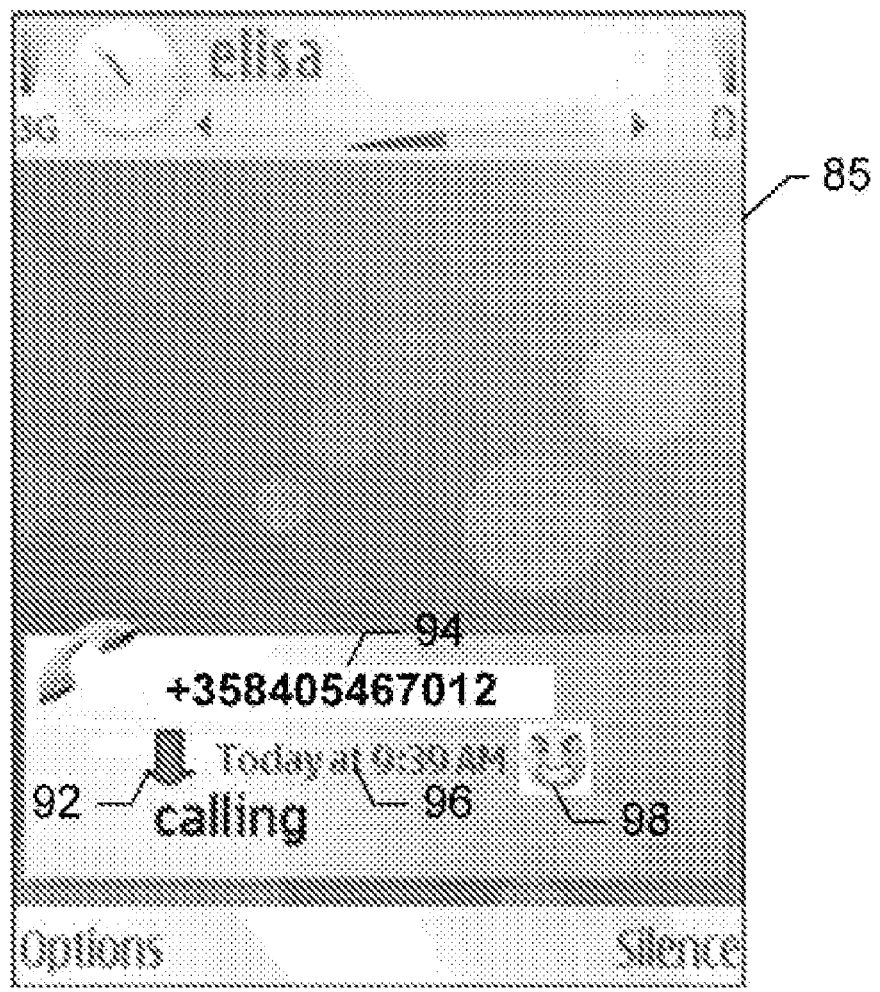
Figure 8:
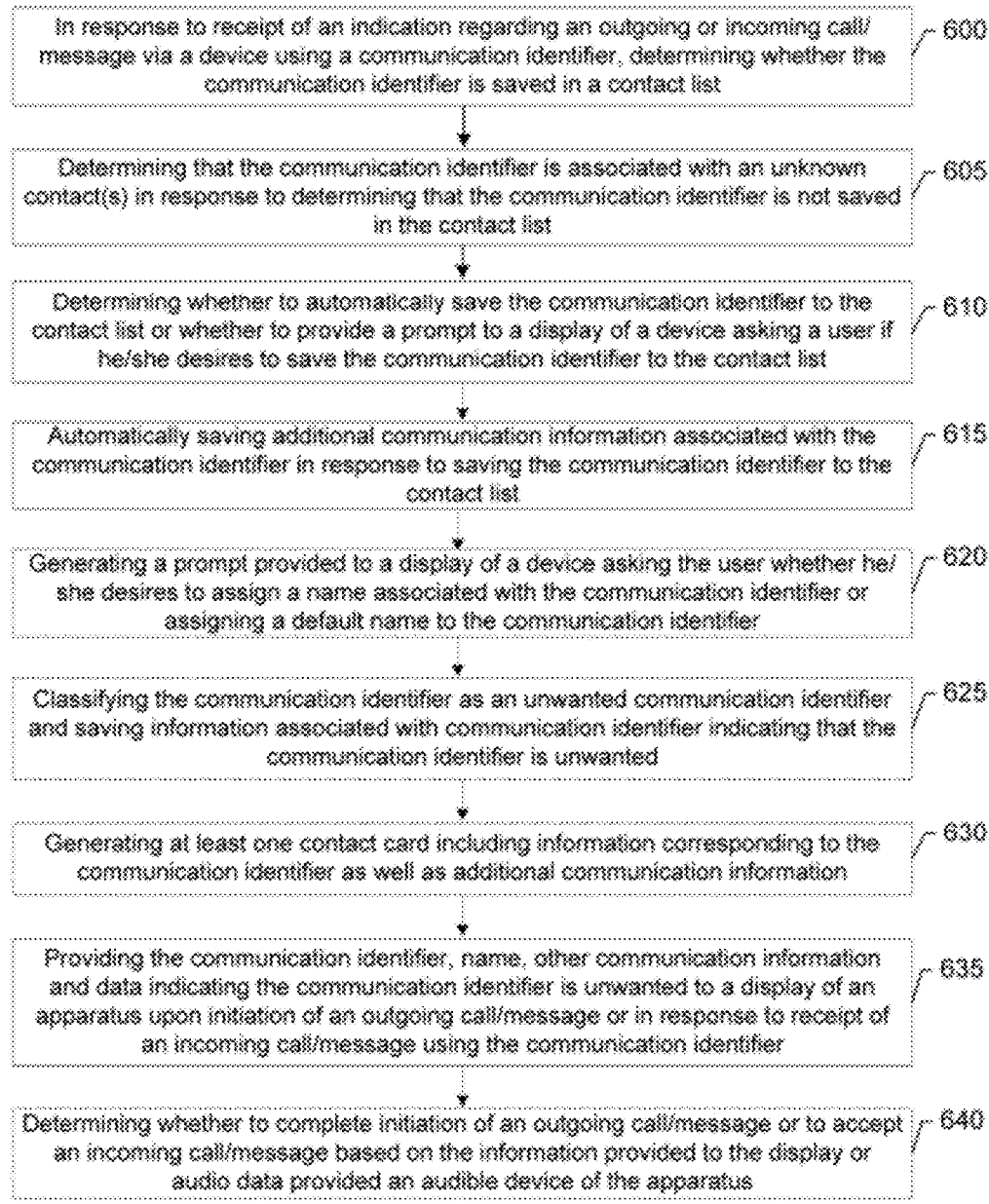

Having thus described the invention in general terms, reference will now be made to the accompanying drawings, which are not necessarily drawn to scale, and wherein:

FIG. 1 is a schematic block diagram of a system according to an exemplary embodiment of the invention;

FIG. 2 is a schematic block diagram of an apparatus for automatically generating information associated with one or more unknown contacts according to an exemplary embodiment of the invention;

FIGS. 3 & 4 are diagrams of contact cards relating to unknown contacts according to an exemplary embodiment of the invention;

FIG. 5 is a diagram of a display associated with an incoming call according to a conventional approach;

FIG. 6 is a diagram of a display illustrating information that is generated in response to an outgoing call or message to one or more unknown contacts according to an exemplary embodiment of the invention;

FIG. 7 is another diagram of a display illustrating information that is generated in response to an incoming call or message from one or more unknown contacts according to an exemplary embodiment; and FIG. 8 is a flowchart according to an exemplary method for automatically generating information associated with one or more unknown contacts according to an exemplary embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a generic system diagram in which a device such as a mobile terminal 10 is shown in an exemplary communication environment. As shown in FIG. 1, an embodiment of a system in accordance with an example embodiment of the invention may include a first communication device (e.g., mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ embodiments of the present invention may comprise all the devices illustrated and/or described herein. While several embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In some embodiments, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In example embodiments, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an exemplary embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an exemplary embodiment, one or more of the devices in communication with the network 30 may employ a contact screener. The contact screener is configured to identify whether a call or message is received based on a communication identifier(s) associated with a sender and the contact screener may determine whether the communication identifier is included in a contact list of a communication device (e.g., mobile terminal 10).

In an exemplary embodiment, the mobile terminal 10 and the second and third communication devices 20 and 25 may be configured to include the contact screener. However, in other alternative embodiments the mobile terminal 10 may include the contact screener and the second and third communication devices 20 and 25 may be network entities such as servers or the like that are configured to communicate with the mobile terminal 10.

In an exemplary embodiment, the mobile terminal as well as the second and third communication devices 20 and 25 may employ an apparatus (e.g., apparatus of FIG. 2) capable of employing embodiments of the invention.

FIG. 2 illustrates a schematic block diagram of an apparatus for automatically generating information associated with one or more unknown contacts according to an exemplary embodiment of the invention. An exemplary embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in certain embodiments.

Referring now to FIG. 2, an apparatus 50 for automatically generating information associated with one more unknown contacts is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content. The memory device 76 may store one or more contact lists (also referred to herein as phonebooks) containing the names of saved contacts and their associated communication identifiers (e.g., phone numbers, email addresses, IM screen names, usernames, etc.) as well as additional information including, but not limited to, one or more photos, pictures, videos or the like associated with contacts. The memory device 76 may also store communication identifiers and communication information associated with unknown contacts. The communication identifiers and the communication information associated with the unknown contacts may be arranged in contact cards and grouped separately from the contact lists of the apparatus 50. As referred to herein, unknown contacts may be contacts that the user of the apparatus 50 has been in communication with but has not saved to a contact list of the apparatus 50.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70, which may otherwise be a general purpose processing element or other functionally configurable circuitry if not for the specific configuration provided by the instructions, to perform the algorithms and operations described herein. However, in some cases, the processor 70 may be a processor of a specific device (e.g., a mobile terminal) adapted for employing embodiments of the invention by further configuration of the processor 70 by instructions for performing the algorithms and operations described herein. The processor 70 may be configured to operate a connectivity program, such as a conventional Web browser. The connectivity program may then enable the apparatus 50 to transmit and receive Web content, such as location-based content, according to a Wireless Application Protocol (WAP), for example. The processor 70 may also be in communication with a display 85 and may instruct the display to illustrate any suitable information, data, content (e.g., media content) or the like.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. The communication interface 74 may receive and/or transmit data via one or more communication channels. Additionally in some embodiments the communication interface 74 may include a communication modem and/or hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

It should be pointed out that the processor 70 may comprise user interface circuitry configured to control at least some functions of one or more elements of the user interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In an exemplary embodiment, the processor 70 may be embodied as, include or otherwise control a contact screener 78. The contact screener 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the contact screener 78 as described below. Thus, in examples in which software is employed, a device or circuitry (e.g., the processor 70 in one example) executing the software forms the structure associated with such means.

In this regard, for example, the contact screener 78 may be configured to perform, among other things, contact screening functions with respect to calls or messages sent from the apparatus 50 to another communication device (e.g., second communication device 20) as well as calls or messages received from another communication device. In this regard, the contact screener 78 is configured to determine whether a call or message is sent to (also referred to herein as outgoing call/message) or received from (also referred to herein as incoming call/message) a communication identifier (e.g., telephone number) associated with a contact (e.g., John Doe) that is listed in a contact list stored in a memory (e.g., memory device 76) of the apparatus 50 (e.g., mobile terminal 10).

As referred to herein calls may include, but are not limited to, telephone calls (e.g., audio or voice data communication), video calls (e.g., video and audio data communication) or the like and messages may include, but are not limited to, voice messages, short message service (SMS) messages (e.g., text messages), multimedia messaging service (MMS) messages (e.g., video messages), instant messages (e.g., chat messages) or the like. In an exemplary embodiment, the video calls may be provided by an application such as Skype™ or any other suitable application that is capable of handling video calls and the instant messages may, but need not be provided by applications such as Facebook™, Google Talk™, Twitter™, MySpace™ and any other applications that are capable of providing instant messaging and social friend networking services.

When the contact screener 78 determines that the communication identifier is included in a contact list of the apparatus 50, the contact screener 78 is configured to instruct the display 85 to show a contact name and communication identifier associated with the outgoing or incoming call/message as well as any other suitable information. On the other hand, when the contact screener 78 determines that the communication identifier is not listed in a contact list of the apparatus 50, the contact screener 78 may determine that the outgoing or incoming call/message is associated with a contact that is unknown (also referred to herein as unknown contact) to the apparatus 50.

When the contact screener 78 determines that the communication identifier (e.g., telephone number) associated with the outgoing or incoming call/message is not in the contact list, the contact screener 78 may automatically save the communication identifier to a memory (e.g., memory device 76) along with other communication information associated with the call/message. The communication information that the contact screener 78 may associate with the communication identifier which may be saved to the memory of the apparatus 50 may include, but is not limited to, communication detail information, one or more methods of communicating with an unknown contact(s) associated with the communication identifier, communication event history information associated with previous communications between a user of the apparatus 50 and an unknown contact(s) associated with the communication identifier as well as any other suitable information, content, data or the like.

In an exemplary embodiment, the communication detail information may include, but is not limited to, a date and time of the call/message that is determined by the contact screener 78 as well as the duration of the call/message determined by the contact screener 78. The possible methods of communicating with the unknown contact(s) associated with the communication identifier may include, but are not limited to, telephone calls, video calls, SMS messages, MMS messages, instant messages or chat messages, social networking service messages, email messages and any other suitable mechanisms of communicating with unknown contacts.

The communication event history may include, but is not limited to, a number of times that the apparatus 50 and a communication device associated with the unknown contact(s) have previously communicated by using the communication identifier as well as the day, time and duration of the previous call(s)/message(s), as determined by the contact screener 78. In an exemplary embodiment, the contact screener 78 may determine that some or all of the data associated with the previous call(s)/message(s) may be part of the communication event history.

It should be pointed out that the possible methods of communication with the unknown contact(s) may be based on the type of communication identifier detected by the contact screener 78. For example, if the contact screener 78 determines that the communication identifier associated with a call/message received from an unknown contact(s) relates to a phone number, the contact screener 78 may determine that the possible methods of communicating with the unknown contact(s) include, but are not limited to, telephone calls, video calls, SMS messages and MMS messages or the like. In this example, the contact screener 78 may determine that the possible methods of communicating with the unknown contact(s) includes telephone calls, video calls, SMS messages and MMS messages because each of these communication mechanisms are capable of utilizing a phone number to facilitate communication of data. In this regard, for example, the contact screener 78 may generate information specifying that a call/message to the unknown contact(s) may be placed via a corresponding phone application of the apparatus 50 (e.g., Skype™) and this information may be stored in a memory (e.g., memory device 76) of the apparatus 50.

As another example, if the contact screener 78 determines that the communication identifier associated with a call/message received from an unknown contact(s) relates to a social networking service username or an email address associated with an account for the social networking service, the contact screener 78 may determine that a possible communication method(s) with the unknown contact(s) is by using a corresponding social networking service (e.g., Facebook™, MySpace™, Twitter™, Google Talk™, etc). In this regard, the contact screener 78 may generate information specifying that the apparatus 50 may communicate with the unknown contact(s) via a corresponding social networking service application that may be stored on the apparatus 50 and the contact screener 78 may save this information in a memory (e.g., memory device 76) of the apparatus 50.

As yet another example, if the contact screener 78 determines that a communication identifier associated with a call/message received from an unknown contact(s) corresponds to an instant messaging username or an email address associated with an account for an instant messaging service, the contact screener 78 may determine that the possible communication methods with the unknown contact(s) relate to usage of a corresponding instant messaging application (e.g., Windows Live Messenger™) and/or a corresponding social networking service (e.g., Facebook™) that provides instant messaging capability. In this regard, the contact screener 78 may generate information specifying an instant messaging application and/or a social networking service that may be utilized to communicate with the corresponding unknown contact(s) and the contact screener 78 may save this information in a memory (e.g. memory device 76) of the apparatus 50.

Additionally, if the contact screener 78 determines that the communication identifier associated with a call/message received from an unknown contact(s) relates to an email address, the contact screener 78 may determine that the possible communication methods may include, but are not limited to, emailing the unknown contact(s). In this regard, the contact screener 78 may generate information specifying one or more email applications such as for example Google Mail™ (Gmail™) that a user of the apparatus 50 may utilize to email the unknown contact(s) and the contact screener may store this generated information in a memory (e.g., memory device 76) of the apparatus 50.

When the contact screener 78 determines that the outgoing or incoming call/message is associated with a communication identifier that is not listed in a contact list of the apparatus 50, the contact screener 78 may automatically generate one or more contacts (also referred to herein as temporary contacts) associated with the communication identifier of one or more corresponding unknown contacts. In this regard, the contact screener 78 may automatically generate one or more contact cards associated with the unknown contacts and the contact screener 78 may include the above-described communication information (e.g., the communication detail information, the possible communication methods and the communication event history) and the corresponding communication identifier in the contact cards associated with the contacts generated by the contact screener 78.

Additionally, the contact screener 78 may include data in the contact cards that relates to content, information or the like of the call/message being sent to or received from an unknown contact. For purposes of illustration and not of limitation, if the message corresponds to a MMS message for example, the contact screener 78 may include a photo or a link to a video clip of the MMS message in the contact cards generated by the contact screener 78.

The contacts automatically generated by contact screener 78 may be arranged, grouped and maintained by the contact screener 78 in a list that is separate from the main contact list of the apparatus 50. In an exemplary embodiment, the contact screener 78 may generate a name for the list, signifying that the contacts generated by the contact screener 78 are not included within the main contact list or phonebook of the apparatus 50. In this regard, the contact screener 78 may name the list "suggested contacts" or "unknown contacts" or any other suitable name that serves to signify that the list is not the main contact list of the apparatus 50.

In an exemplary embodiment, the contact screener 78 may name the list suggested contacts or unknown contacts or any other suitable name signifying that the contacts are not saved in the main contact list of the apparatus 50. In an alternative exemplary embodiment, the contact screener 78 may arrange and maintain the contacts as a sub-group of the main contact list of the apparatus 50. The sub-group may be named by the contact screener 78 to signify that the contacts of the sub-group relate to unknown contacts. It should be pointed out that a user of the apparatus 50 may add one or more of the contacts generated by the contact screener 78 to the main contact list of the apparatus 50. In this regard, the contact cards generated by the contact screener may include an option to create a new contact that will be listed in the main contact list and the contact cards may also include an option to link the corresponding contact to an existing contact in the main contact list of the apparatus 50.

It should be pointed out that the list of contacts generated by the contact screener 78 may be shown and accessible via the display 85 of the apparatus 50. In this regard, a user of the apparatus 50 may tap or select a contact in the list generated by the contact screener 78 and in response a contact card generated by the contact screener 78 may be provided to the display 85.

The contacts and contact cards that are automatically generated by the contact screener 78 may be beneficial to a user since a user may desire to communicate with one or more unknown contacts but may not desire to take the time to include the unknown contacts in the main contact list of the apparatus 50. Additionally, the user may utilize the additional communication information that is gathered by the contact screener 78 and included in the contact cards to determine whether the user desires to communicate with an unknown contact(s).

In this regard, consider an example in which the apparatus 50 receives a call/message from a communication identifier (e.g., telephone number) that the contact screener 78 determines is not included in the main contact list (e.g. primary contact list or primary phonebook) of the apparatus 50. As such, the contact screener 78 may determine whether this is the first communication with the apparatus 50 regarding the communication identifier. If this is the first communication with the apparatus 50, the contact screener 78 may store, to a memory (e.g., memory device 76) of the apparatus 50, the communication detail information such as for example, the communication identifier, the date (e.g., Dec. 7, 2009) and time (e.g., 7:00 AM) of the call/message and the duration (e.g., 15 minutes) of the call/message, as well as the possible methods of communicating by using the communication identifier (e.g., telephone call, video call, SMS message, MMS message) and the communication event history regarding communications from/to an unknown contact(s) associated with the communication identifier. In this regard, the communication event history may include data specifying a number of times that the apparatus 50 has previously communicated with a communication device of an unknown contact(s) that is associated with the communication identifier.

In this example, there is no communication event history since this is the first communication regarding the communication identifier. However, it should be pointed out that in an exemplary embodiment, the contact screener 78 may store information in a memory (e.g., memory device 76) of the apparatus 50 indicating that there is no communication event history regarding the communication identifier.

The contact screener 78 may gather the information stored in the memory (e.g., memory device 76) of the apparatus 50 regarding the communication identifier and generate a contact associated with the communication identifier (e.g., telephone number). The contact may be included in the list generated by the contact screener 78 in the manner discussed above. Additionally, the contact screener 78 may automatically generate a contact card for this contact in which the contact card includes the communication identifier, the date (e.g., Dec. 7, 2009), time (e.g., 7:00 AM) and duration (e.g., 15 minutes) of the call/message, the possible methods of communicating with the communication identifier (e.g., telephone call, video call, SMS message, MMS message, etc.) and any communication event history associated with an unknown contact(s) corresponding to the communication identifier. In this example, the contact screener 78 may include information in the contact card specifying that there is no previous communication event history with the communication identifier.

When the apparatus 50 subsequently begins the process of generating an outgoing call/message based on the communication identifier or receiving an incoming call/message regarding the communication identifier (e.g., phone number), the above-described information of the corresponding contact card associated with the communication identifier may be provided to the display 85 of the apparatus 50. In this regard, the user of the apparatus 50 may utilize the information of the contact card to determine whether to send the call/message or accept the call/message from the unknown contact(s) associated with the communication identifier.

For instance, when the user begins to generate an outgoing call/message or receive an incoming call/message, the user may evaluate the information of the contact card provided to the display and determine that the apparatus 50 previously communicated with a communication device (e.g., second communication device) of an unknown contact(s) via the corresponding communication identifier (e.g., phone number) on a given date (e.g., Dec. 7, 2009), time (e.g., 7:00 AM) and the duration (e.g., 15 minutes) of the call/message. Additionally, the user may evaluate the possible methods of communicating with the unknown contact(s) identified in the contact card. On the basis of the information in the contact card generated by the contact screener 78, the user may determine whether to complete an outgoing call/message or accept/reject a received call/message. For instance, in this example, the user may determine to complete the outgoing call/message since the user previously communicated with the communication identifier for 15 minutes as opposed to a negligible amount of time (e.g., 10 seconds) which may tend to indicate that the user previously ended a call/message prematurely.

It should also be pointed out that if the apparatus 50 completes the outgoing call/message or the apparatus 50 accepts the incoming call/message, the contact screener 78 may update the contact card information associated with the corresponding communication identifier (e.g., phone number). In this regard, the contact screener 78 may update the contact card to include the new communication detail information associated with the call/message (e.g., the date, time and duration of this call/message). For example, if the apparatus 50 completes the outgoing call/message or accepts the incoming call/message, the contact screener 78 may add the date (e.g., Dec. 8, 2009), time (e.g., 3:00 PM) and duration (e.g., 20 minutes) of this call/message to the communication detail information of the corresponding contact card. Additionally, the contact screener 78 may update the communication event history on the corresponding contact card to include information specifying that the apparatus 50 previously communicated (e.g., Dec. 7, 2009 at 7:00 AM for a duration of 15 minutes) with the unknown contact(s) associated with the communication identifier.

In this manner, the user of the apparatus 50 may utilize the information of the corresponding updated contact card to determine whether to complete an outgoing call/message or accept/reject an incoming call/message associated with the communication identifier. Since the user may evaluate the display 85 of the apparatus 50 and determine that the contact card indicates that there were two calls/messages (for a duration of 15 minutes and 20 minutes respectively) associated with an unknown contact(s) corresponding to the communication identifier, the user may determine to complete the outgoing call/message or accept the incoming call/message. The user of the apparatus 50 may determine to complete the call/message or accept the call/message since the two previous calls/messages were of a duration that may suggest that the user did not prematurely end the call/message and that the user actually wanted to communicate with the unknown contact(s). On the other hand, if the two previous calls/messages had a duration of 5 seconds or less, for example, the user may determine not to complete the call/message or accept the call/message because such a duration may suggest that the user has no desire to communicate with the unknown contact(s).

It should also be pointed out that the communication detail information such as for example the date, time and duration of the calls/messages as well as the communication event history information relating to a number of previous communications with the unknown contact(s) may help the user of the apparatus 50 remember a name of a person corresponding to the unknown contact(s). For instance, when the user evaluates a contact card on a display 85 of the apparatus 50 and determines that the user previously communicated with an unknown contact on a particular date (e.g., Dec. 8, 2009), and time (e.g., 3:00 PM) for a given duration (e.g., 20 minutes), the user may remember a name (e.g., John Doe) of a person corresponding to the unknown contact(s). Based on the user remembering the name of the person, the user may determine to complete an outgoing call/message or accept an incoming call/message associated with a communication identifier corresponding to the person since the user may determine that he/she desires to communicate with the person.

Referring now to FIGS. 3 & 4, contact cards relating to unknown contacts according to exemplary embodiments of the invention are provided. As shown in FIGS. 3 & 4, the list of unknown contacts 10 (also referred to herein as unknown contacts list 10) may include a number of unknown contacts. While three unknown contacts 10, 12 and 14 are shown in the unknown contacts list 10 in FIGS. 3 & 4, it should be pointed out that any suitable number of unknown contacts may be included in the unknown contacts list 10. Additionally, it should be pointed out that the unknown contacts list 10 and contact cards 15 and 17 may be shown on a display (e.g., display 85) of the apparatus 50. Also, as shown in FIGS. 3 & 4, the contact screener 78 detected a call from an unknown contact 12 associated with a phone number 903124465161 (relating to an international phone number) on Monday Jan. 5, 2009 at 12:24 pm and the contact screener 78 detected a chat message or instant message from an unknown contact 14 having a screen name Grape82 on Monday Jan. 5, 2009 at 12:24 pm. The contact screener 78 also detected an email from an unknown contact 16 having an email address ruth_a@hotmail.com associated with a user name Ruth Atkins on Monday Jan. 5, 2009 at 12:24 pm.

It should be pointed out that the contact screener 78 may save the communication details associated with the detected unknown contacts 12, 14, and 16 and may include some of the communication details in the unknown contacts list 10 as well as the contact cards 15 and 17 generated by the contact screener 78. As shown in FIG. 3, in response to receiving a selection 18 of an unknown contact 12, for example, the contact screener 78 may instruct the display 85 to show the contact card 15 associated with unknown contact 12. In this regard, the contact card 15 shows communication history with the unknown contact 12. For instance, contact card 15 shows a SMS message 21 (or text message) received by the apparatus 50 from unknown contact 12 at 4:12 pm (also referred to herein as 16:12) on Jan. 5, 2009. The contact card 15 also shows a call 23 received by the apparatus 50 from unknown contact 12 at 2:12 pm (also referred to herein as 14:12) on Jan. 5, 2009 and shows that the duration of the call was 45 seconds (also referred to herein as 00:00:45).

Additionally, the contact card 15 shows the possible options, determined by the contact screener 78, in which the user of the apparatus 50 may communicate with the unknown contact 12. In this regard, the contact screener 78 determined that the apparatus 50 may call the unknown contact 12 and/or send the unknown contact 12 a SMS message and the contact screener 78 generated options 25 and 27 in the contact card 15 for calling and/or sending the unknown contact 12 a SMS message. The contact screener 78 also generated options 29 and 31 for adding the contact card 15 to a main contact list (e.g., phonebook) and adding the unknown contact 12 as a new contact to the main contact list.

Referring now to FIG. 4, in response to the contact screener 78 receiving a selection 33 of the unknown contact 14, the contact screener 78 may instruct the display 85 to show the contact card 17 associated with unknown contact 14. In this regard, the contact screener 78 may determine the communication history with the unknown contact 14 and the communication history may be included by the contact screener 78 in the contact card 17. In this example, the contact screener 78 determined that the communication history relates to a user of the apparatus 50 communicating with the unknown contact 14 via a chat conversation 35 on Sep. 9, 2009 at 2:30 pm (also referred to herein as 14:23). The contact card 17 also shows that the contact screener 78 determined that the communication history involves an internet call 37 between a user of the apparatus 50 and the unknown contact 17. In this regard, the contact screener 78 determined that the internet call was on Sep. 9, 2009 at 10:23 pm (also referred to herein as 10:23) and lasted for a duration of 12 minutes and 45 seconds (also referred to herein as 00:12:45).

The contact screener 78 also determined that the apparatus 50 may communicate with the unknown contact 14 via chat and/or a VoIP call and in this regard the contact screener 78, included options 39 and 41 in the contact card 17 for communicating with the unknown contact 14 via chat and/or a VoIP call. Additionally, the contact screener 78 included an option 43 in the contact card 17 for adding the unknown contact 14 to a main contact list (e.g., phonebook). The contact screener 78 also included an option 45 in the contact card 17 for adding the unknown contact 14 in the main contact list as a new contact.

By using exemplary embodiments of the invention, a user of the apparatus 50 may utilize automatically generated contacts that are included in a list separate from a main contact list of communication device in order to communicate with one or more unknown contacts. In this regard, the user does not have to perform the tedious and time consuming task of manually saving a communication identifier(s) associated with an unknown contact(s) to a main contact list of a communication device (e.g., apparatus 50).

Additionally, based on the communication information included in the contact cards of the exemplary embodiments, the user of a communication device (e.g., apparatus 50) may utilize the information to determine the identity of an unknown contact(s). Moreover, the communication information in the contacts cards of the exemplary embodiments may assist the user in determining whether to complete an outgoing call/message or accept an incoming call/message that is associated with the communication identifier.

In another alternative exemplary embodiment, when the contact screener 78 determines that a communication identifier(s) corresponding to an outgoing call/message or an incoming call/message is not identified in a main contact list of the apparatus 50, the contact screener 78 may generate a prompt that is provided to a display (e.g., display 85) of the apparatus 50. In this regard, the contact screener 78 may include information in the prompt asking the user whether the user desires to save the communication identifier to a main contact list (also referred to herein interchangeably as primary contact list and/or phonebook) of the apparatus 50.

If the user decides not to save the communication identifier to the main contact list, the contact screener 78 may temporarily store the communication identifier in a memory of the apparatus 50 with minimal communication details such as for example the date and time of the corresponding call/message. However, if the user decides to save the communication identifier to the main contact list, the contact screener 78 may generate another prompt that is provided to the display of the apparatus and this prompt may include information asking the user whether he/she would like to assign a name (e.g., John Doe) to the communication identifier. When the user elects to assign a name to the communication identifier by making a selection via a pointing device or the like of the user input interface 72, the contact screener 78 may associate the name with the communication identifier and may include the name and corresponding communication identifier in the main contact list.

On the other hand, when the user of the apparatus 50 does not assign a name, the contact screener 78 may automatically generate a default name that is assigned to the communication identifier. In this regard, the contact screener 78 may associate the default name with the communication identifier and include the default name and corresponding communication identifier in the main contact list. In an exemplary embodiment, the contact screener 78 may assign the default name as the date and time (e.g., Nov. 27, 2009 at 7:00 PM) that the outgoing call/message was placed or the incoming call/message was received by the apparatus 50.

In response to the user deciding to save the communication identifier to the main contact list, the contact screener 78 may also generate a prompt that is provided to the display (e.g., display 85) of the apparatus 50 and this prompt may include information asking the user whether he/she would like to classify the corresponding communication identifier as an unwanted communication identifier (e.g., unwanted phone number, unwanted email address, unwanted instant message username, unwanted social networking service username, etc.). When the user of the apparatus 50 decides to classify the applicable communication identifier as an unwanted communication identifier, the contact screener 78 may define the communication identifier in the main contact list as an unwanted communication identifier.

In this regard, when an outgoing call/message is being placed or an incoming call/message is being received from the corresponding communication identifier, the contact screener 78 may instruct the display of the apparatus 50 to show that the communication identifier is unwanted. In this manner, a user is able to easily and efficiently verify that he/she would not likely want to communicate with the unknown contact(s) (e.g., a salesman, telemarketer, etc.) associated with the communication identifier.

The unwanted communication identifiers may be shown on a display (e.g., display 85) of the apparatus 50 according to various mechanisms. For instance, unwanted communication identifiers may be shown on the display as text (e.g., text such as "unwanted", "unwanted communication", "unwanted communication identifier", etc.) as well as by visible indicators (e.g., one or more fonts or colors (e.g., red font, etc.). The unwanted communication identifiers may also be shown on the display as one or more graphical indicators (e.g., one or more icons) as well as any other suitable indicators. For example, the unwanted communication identifiers may be associated with one or more audible indicators (e.g., one or more ring tones, songs, etc.).

It should be pointed out that a user of the apparatus 50 may select a feature on the apparatus 50 regarding whether to convey the unwanted communication identifiers as text, as a visible indicator (e.g., font color), graphical indicator (e.g., icon) or as an audible indicator (e.g., ring tone). In this regard, when an outgoing call/message is placed or an incoming call/message is received corresponding to the unwanted communication identifier, the contact screener 78 may indicate that the communication identifier is unwanted based on the mechanism selected by the user (e.g., as a graphical icon provided to a display). In this manner, the user may immediately know that the call/message is being placed to or received from an unknown contact(s) that the user probably does not desire to communicate with.

It should also be pointed out that communication identifiers designated as unwanted communication identifiers may be hidden by the contact screener 78 in the main contact list of the apparatus 50. In this regard, the unwanted communication identifiers and associated information included in the main contact list may not be visible. As such, when a user scrolls through the main contact list of the apparatus 50 the user may be unable to view the unwanted communication identifiers and associated information. However, the user may select a setting on the apparatus 50 to view the unwanted communication identifiers and associated information. The user may select a setting by using a pointing device or the like of the user interface 72 to access a menu, folder, tab or the like in the main contact list which may allow all of the communication identifiers and associated contact information in the main contact list to be viewable.

It should also be pointed out that in lieu of providing the display (e.g., display 85) of the apparatus 50 with a prompt or query asking the user whether he/she would like to save a communication identifier to the main contact list, a user of the apparatus 50 may select a feature of the apparatus 50 to automatically save all communication identifiers, corresponding to one or more unknown contacts, in the main contact list. In this regard, when the contact screener 78 determines that a communication identifier corresponding to an outgoing or incoming call/message is not in the main contact list, the contact screener 78 may automatically include the communication identifier and associated information in the main contact list.

For instance, the contact screener 78 may save associated information along with the communication identifier in the main contact list and the associated information may include, but is not limited to, the time, date, duration of a communication corresponding to the call/message, the number of times that calls/messages have previously been placed to or received from this communication identifier including the corresponding dates, times and durations of these calls/messages and any other suitable information. It should be pointed out that the communication identifiers that may be automatically saved by the contact screener 78 may also be defined as unwanted communication identifiers in the manner described above.

Additionally, in an exemplary embodiment, the contact screener 78 may also associate geotagged information with one or more communication identifiers that are included in the main contact list of the apparatus 50. In this regard, the geotagged information may include, but is not limited to, data specifying that an outgoing call/message was placed or an incoming call/message was received in a particular geographic area (e.g., Rome Italy) on a given date, time and for a given duration. For example, the geotagging information generated by the contact screener 78 may specify that the user of the apparatus 50 called an unknown contact corresponding to the communication identifier (e.g., phone number) three months ago while the user was in Rome, Italy. In this regard, if the unknown contact calls the apparatus 50 using the communication identifier, the contact screener 78 may provide the geotagged information to the display along with the communication identifier and other information. The user may utilize the geotagged information to decide to answer the call since the user may utilize the information to remember that the unknown contact relates to someone that the user may want to communicate with given that the user previously initiated communication with the unknown contact in Rome, Italy.

It should be pointed out that any of the information that is saved in the main contact list, by the contact screener 78, and is associated with the communication identifiers may be provided to a display of the apparatus 50 in response to a call/message being placed or a call/message being received from the corresponding communication identifier. Similar to the example above relating to the geotagged information, the user of the apparatus 50 may be able to evaluate the information saved by the contact screener 78 in the main contact list (e.g., an indication that the user received a communication from this communication identifier on a previous day and that the communication lasted for a duration of 1 hr.) and easily determine whether he/she recognizes and is familiar with a corresponding communication identifier. On this basis, the user of the apparatus 50 may determine whether to complete an outgoing call/message or accept an incoming call/message.

Referring now to FIG. 5, a display associated with an incoming call from an unknown sender according to a conventional approach is provided. As shown in FIG. 5, when a conventional communication device receives an incoming call from an unknown contact, the communication device may only provide the details to a display 100 indicating the phone number of the unknown contact that a caller is using to place the call. As such, a user may find it difficult to determine whether the call is being sent from someone that the user actually wants to communicate with.

Referring now to FIG. 6, a display illustrating information that is generated in response to an outgoing call or message to one or more unknown contacts is provided. It should be pointed out that the information shown on the display 85 of FIG. 6 may be generated by the contact screener 78 of the apparatus 50. In the exemplary embodiment of FIG. 6, the contact screener 78 may determine that the user of the apparatus 50 is in the process of initiating an outgoing call or message to a communication device (e.g., second communication device 20) by using a communication identifier. In this example, the communication identifier 88 is an international phone number such as for example 358405461307 and the apparatus 50 is using the phone number to call or send a message to a communication device associated with an unknown contact.

In this regard, the contact screener 78 may analyze the main contact list of the apparatus 50 and determine that the communication identifier (e.g., the phone number corresponding to 358405461307) was previously included in the main contact list. Additionally, in this exemplary embodiment, the contact screener 78 may determine that a default name 86 such as for example Dec. 1, 2009 at 7:00 PM corresponds to a day and time of a previous outgoing call/message to a communication device using the communication identifier or an incoming call/message received from the communication device using the communication identifier. As such, when the outgoing call is initiated by the apparatus 50, the contact screener 78 may provide the communication identifier and the name associated with the communication identifier to display 85. In this regard, the user may evaluate the communication identifier and the name associated with the communication identifier provided on the display 85 and the user may determine that he/she previously communicated with an unknown contact associated with the communication identifier on Dec. 1, 2009 at 7:00 PM. As such, the user may utilize the information provided on the display 85 to determine that the outgoing call or message to a communication device associated with the communication identifier should be completed since an unknown contact corresponding to the communication identifier is likely someone that the user wishes to communication with.

It should be pointed out that the contact screener 78 may provide a graphical indicator 90 such as for example an upward arrow to the display 85 to indicate that the call/message corresponds to an outgoing call/message since the apparatus 50 may be initiating the call/message. Additionally, the contact screener 78 may provide the graphical indicator 90 with a visible indicator such as for example a color, font or the like to signify a type of previous communication with apparatus 50 based on the communication identifier. For instance, in the example embodiment of FIG. 6, the contact screener 78 may include a visible indicator such as a blue color to the graphical indicator 90 to signify to the user that the previous communication relates to a SMS (e.g., text) or MMS message received by the apparatus 50 based on the communication identifier. It should be pointed out that other visible indicators of the graphical indicator may correspond to other types of communications.

For purposes of illustration and not of limitation, the contact screener 78 may include a visible indicator such as for example a green color to a graphical indicator (e.g., graphical indicator 90 of FIG. 6 and graphical indicator 92 of FIG. 7) to signify that a previous communication relates to a phone call or video call, and the contact screener 78 may include a visible indicator such as a yellow color to a graphical indicator to signify that a previous communication relates to an email message. Additionally, the contact screener 78 may include a visible indicator such as for example an orange color to a graphical indicator to signify that a previous communication relates to an instant message or a social networking service message.

While the visible indicators applied to the graphical indicators described above correspond to colors it should be pointed out that visible indicators other than colors (e.g., one or more fonts) may be applied to the graphical indicators without departing from the spirit and scope of the invention.

Referring now to FIG. 7, a display illustrating information that is generated in response to receiving an incoming call or message from an unknown contact according to an exemplary embodiment is provided. In the exemplary embodiment of FIG. 7, the contact screener 78 may determine that a communication identifier 94 such as for example an international phone number (e.g., 358405467012) is included in a main contact list of the apparatus as an unknown contact. In this regard, the contact screener 78 may determine that it assigned a default name 96 (e.g., Today at 9:39 AM) to the communication identifier 94 based on a corresponding day and time of a previous communication with a communication device (e.g., second communication device 20) using the communication identifier 94. It should also be pointed out that the contact screener may provide a graphical indicator 92 such as a downward arrow to the display 85 signifying that the received call/message is an incoming call/message being sent from a communication device using the communication identifier (e.g., phone number). In this example, the graphical indicator 92 may include a visible indicator such as green color signifying that the previous communication with the apparatus 50 based on the communication identifier relates to a phone call or video call.

Additionally, it should be pointed out that the contact screener 78 may analyze the communication information associated with the communication identifier 94 included in the main contact list of the apparatus 50 and the contact screener 78 may determine that when the previous communication with the communication identifier occurred, the user of the apparatus 50 classified the communication identifier 94 as an unwanted communication identifier. In the exemplary embodiment of FIG. 7, the user elected to indicate that the communication identifier 94 corresponds to an unwanted communication identifier by associating an icon 98 with the communication identifier 94 and a visible indicator associated with the name 96 corresponding to the communication identifier. In this example, the visible indicator associated with the name 96 may correspond to a red color corresponding to the text of the name 96 (e.g., Today at 9:30 AM in red font). However, any other suitable visible indicator may be associated with the name 96 to indicate that the communication identifier corresponds to an unwanted communication identifier.

As such, when the contact screener 78 determines that the apparatus 50 is receiving an incoming call/message for a communication device (e.g., second communication device 20) by using the communication identifier 94 to call or send the message, the contact screener 78 may provide the communication identifier 94 as well as the graphical arrow 92, the name associated with the communication identifier and the icon 98 to the display 85. The user may analyze the icon 98 and the visible indicator (e.g., red color) associated with the name 96 provided on the display 85 and may determine to reject or not accept the call or message because the call/message is being received from an unwanted communication identifier (e.g., unwanted phone number). As such, the user may quickly and easily determine that he/she probably does not want to communicate with the unknown contact associated with the communication identifier 94.

Referring now to FIG. 8, a flowchart for automatically generating information associated with one or more unknown contacts is provided. At operation 600, in response to an indication regarding an outgoing call/message or an incoming call/message via a communication device using a communication identifier, determining whether the communication identifier is saved in at least one contact list (e.g., a main contact list, a secondary contact list or phonebook) of an apparatus (e.g., apparatus 50). It should be pointed out that the contact screener 78 may determine whether the communication identifier is saved in the contact list. At operation 605, a communication device (e.g., apparatus 50) may determine that the communication identifier is associated with an unknown contact(s) in response to determining that the communication identifier is not saved in the contact list. In an exemplary embodiment, the contact screener 78 may determine that the communication identifier is associated with an unknown contact in response the contact screener 78 determining that the communication identifier is not saved in the contact list.

At operation 610, a communication device (e.g., apparatus 50) may determine whether to automatically save the communication identifier to the contact list or whether to generate a prompt that is provided to a display of the communication device asking a user if he/she desires to save the communication identifier to the contact list. In this regard, the contact screener 78 of the apparatus 50 may determine whether to automatically save the communication identifier or whether to generate the prompt that is provided to a display (e.g., display 85) of the apparatus 50.

At operation 615, in response to a determination that the communication identifier is being saved to the contact list, additional communication information associated with the communication identifier may also be saved to the contact list. In this regard, the contact screener 78 may save the additional communication information associated with the communication identifier to the contact list. The additional communication information may include, but is not limited to, communication detail information such as for example a time, day and duration of a call/message, possible methods of communicating with an unknown contact(s) based on the communication identifier and communication event history (e.g., a number of times that an apparatus (e.g., apparatus 50) previously communicated with a communication device by using the communication identifier).

Optionally, at operation 620, a prompt may be generated and provided to a display of a communication device (e.g., apparatus 50) asking the user whether he/she desires to assign a name associated with the communication identifier or a default name may be assigned to the communication identifier. In this regard, the prompt may be generated by the contact screener 78 and the default name may be assigned to the communication identifier in the manner described above.

Optionally, at operation 625, the communication identifier may be classified and defined as an unwanted communication identifier and the information indicating that the communication identifier is classified and defined as unwanted may be saved to the contact list. The classification of the communication identifier as unwanted may be performed by the contact screener 78 in the manner described above. Optionally, at operation 630, one or more contact cards may be generated in which the contact cards include information corresponding to one or more communication identifiers as well as the additional information associated with operation 615 (e.g., the communication detail information, the possible methods of communicating with an unknown contact(s) and the communication event history) or any other suitable information. The contact screener 78 may generate the contact cards.

At operation 635, the communication identifier, the name associated with the communication identifier, the additional communication information and data indicating that the communication identifier is unwanted may be provided to a display (e.g., display 85) of a communication device (e.g., apparatus 50) upon initiating an outgoing call/message or in response to receipt of an incoming call/message using the communication identifier. In this regard, the contact screener 78 may provide the communication identifier and the associated name, the additional communication information and the data indicating that the communication identifier is unwanted to the display. Additionally, it should be pointed out that the data (e.g., an audible ring tone) indicating that the communication identifier is unwanted may also be provided by the contact screener 78 to an audio device (e.g., speakers) of the communication device (e.g., apparatus 50).

Optionally, at operation 640, a determination may be made regarding whether to complete initiation of an outgoing call/message or to accept an incoming call/message based on the information (e.g., an icon indicating the communication identifier is unwanted) provided to a display (e.g., display 85) of a communication device (e.g., apparatus 50) or audio data (e.g., ring tone) indicating that the communication identifier is unwanted) provided to an audible device (e.g., speakers) of the communication device.

In an alternative exemplary embodiment, a user of a communication device (e.g., apparatus 50) may select a feature on the communication device (e.g., apparatus 50) provided by the contact screener instructing the communication device not to complete the initiation of outgoing calls/messages or accept incoming calls/messages that are associated with a communication identifier classified or defined as unwanted.

It should be pointed out that FIG. 8 is a flowchart of a system, method and computer program product according to exemplary embodiments of the invention. It will be understood that each block or step of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76) and executed by a processor (e.g., processor 70, contact screener 78). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowchart blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart blocks or steps.

Accordingly, blocks or steps of the flowchart support combinations of means for performing the specified functions and combinations of steps for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In an exemplary embodiment, an apparatus for performing the method of FIG. 8 above may comprise a processor (e.g., the processor 70) configured to perform some or each of the operations (600-640) described above. The processor may, for example, be configured to perform the operations (600-640) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (600-640) may comprise, for example, the processor 70 (e.g., as means for performing any of the operations described above), the contact screener 78 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining whether at least one communication identifier is included in contact data of an apparatus in response to determining that a communication is facilitated at least in part based on the communication identifier;
   detecting, via a processor, information associated with the communication identifier, the detected information comprises data indicating whether one or more previous communications associated with the communication identifier are identified and the data comprises content specifying the details of the previous communications;
   providing the detected information and the communication identifier to a display of the apparatus in response to initiation of an outgoing communication or receipt of an incoming communication; and
   determining whether to complete the initiation of the outgoing communication or ignore the received incoming communication based at least in part on the data associated with the previous communications.

2. The method of claim 1, wherein prior to providing, the method further comprises saving the detected information and the communication identifier in the contact data in response to the determination revealing that the communication identifier is not included in the contact data.

3. The method of claim 2, further comprising:
   automatically assigning a name associated with the communication identifier in response to the determination revealing that the communication identifier is not included in the contact data, the assigned name comprises at least one of a date and time associated with the communication; and
   determining that the assigned name is included in the detected information,
   wherein determining whether to complete further comprises determining whether to complete the initiation of the outgoing communication or ignore the received incoming communication based at least in part on the assigned name.

4. The method claim 1, wherein prior to providing, the method further comprises:
   receiving a selection of a feature to automatically define the communication identifier as unwanted corresponding to at least one contact that a user of the apparatus does not want to communicate with; and
   determining that the defined information is included in the detected information, wherein determining whether to complete further comprises determining whether to complete the initiation of the outgoing communication or reject the received incoming communication based at least in part of the definition of the communication identifier as unwanted.

5. The method of claim 4, wherein define further comprises associating at least one graphical indicator or audible indicator with the communication identifier to signify that the communication identifier is unwanted.

6. The method of claim 5, further comprising determining that the graphical indicator comprises at least one of an icon, font, or color of a graphical element and the audible indicator comprises at least one of a ring tone, or a song.

7. The method of claim 1, further comprising generating at least one graphical indicator to signify a type of communication associated with a most recent one of the previous communications.

8. The method of claim 1, further comprising:
determining at least one of a date, time and duration associated with the communication to obtain communication detail information;
identifying one or more mechanisms for communicating with at least one device associated with at least one contact based on the communication identifier to obtain communication mechanism information;
determining that the data associated with the previous communications indicates a number of times that a user of the apparatus previously communicated with the contact based on the communication identifier to obtain communication event history information; and
determining that the communication detail information, the communication mechanism information and the communication event history are included in the detected information,
wherein determining whether to complete further comprises determining whether to complete the initiation of the outgoing communication or ignore the received incoming communication based at least in part on the communication detail information, the communication mechanism information and the communication event history information.

9. The method of claim 8, further comprising:
automatically generating at least one contact card comprising the communication identifier, the communication detail information, the communication mechanism information and the communication event history information; and
facilitating automatic display of the contact card in response to the initiation of the outgoing communication or the received incoming communication associated with the communication identifier,
wherein determining whether to complete the initiation of the outgoing communication or ignore the received incoming communication is based at least in part on analyzing the information of the displayed contact card.

10. An apparatus comprising:
at least one processor; and
at least one memory including computer program code, the at least one memory and the computer program code configured to, with the at least one processor, cause the apparatus to perform at least the following:
determine whether at least one communication identifier is included in contact data of the apparatus in response to determining that a communication is facilitated at least in part based on the communication identifier;
detect information associated with the communication identifier, the detected information comprises data indicating whether one or more previous communications associated with the communication identifier are identified and the data comprises content specifying the details of the previous communications;
provide the detected information and the communication identifier to a display of the apparatus in response to initiation of an outgoing communication or receipt of an incoming communication; and
determine whether to complete the initiation of the outgoing communication or ignore the received incoming communication based at least in part on the data associated with the previous communications.

11. The apparatus of claim 10, wherein the at least one memory and the computer program code are further configured to, with the at least one processor, cause the apparatus to save the detected information and the communication identifier in the contact data in response to the determination revealing that the communication identifier is not included in the contact data.

12. The apparatus of claim 11, wherein the at least one memory and the computer program code are configured to, with the at least one processor, cause the apparatus to:
automatically assign a name associated with the communication identifier in response to the determination revealing that the communication identifier is not included in the contact data, the assigned name comprises at least one of a date and time associated with the communication; and
determine that the assigned name is included in the detected information,
wherein determine whether to complete further comprises determining whether to complete the initiation of the outgoing communication or ignore the received incoming communication based at least in part on the assigned name.

13. The apparatus of claim 10, wherein the at least one memory and the computer program code are configured to, with the at least one processor, cause the apparatus to:
receive a selection to automatically define the communication identifier as unwanted corresponding to at least one contact that a user of the apparatus does not want to communicate with; and
determine that the defined information is included in the detected information, wherein determine whether to complete further comprises determining whether to complete the initiation of the outgoing communication or ignore the received incoming communication based at least in part of the definition of the communication identifier as unwanted.

14. The apparatus of claim 13, wherein the at least one memory and the computer program code are configured to, with the at least one processor, cause the apparatus to define the communication identifier by associating at least one graphical indicator or audible indicator with the communication identifier to signify that the communication identifier is unwanted.

15. The apparatus of claim 14, wherein the at least one memory and the computer program code are configured to, with the at least one processor, cause the apparatus to determine that the graphical indicator comprises at least one of an icon, font, or color of a graphical element and the audible indicator comprises at least one of a ring tone, or a song.

16. The apparatus of claim 10, wherein the at least one memory and the computer program code are configured to, with the at least one processor, cause the apparatus to generate at least one graphical indicator to signify a type of communication associated with a most recent one of the previous communications.

17. The apparatus of claim 10, wherein the at least one memory and the computer program code are configured to, with the at least one processor, cause the apparatus to:
determine at least one of a date, time and duration associated with the communication to obtain communication detail information;
identify one or more mechanisms for communicating with at least one device associated with at least one contact based on the communication identifier to obtain communication mechanism information;

determine that the data associated with the previous communications indicates a number of times that a user of the apparatus previously communicated with the contact based on the communication identifier to obtain communication event history information; and determine that the communication detail information, the communication mechanism information and the communication event history are included in the detected information, wherein determine whether to complete further comprises determining whether to complete the initiation of the outgoing communication or ignore the received incoming communication based at least in part on the communication detail information, the communication mechanism information and the communication event history information.

18. The apparatus of claim 17, wherein the at least one memory and the computer program code are configured to, with the at least one processor, cause the apparatus to:

automatically generate at least one contact card comprising the communication identifier, the communication detail information, the communication mechanism information and the communication event history information; and facilitate automatic display of the contact card in response to the initiation of the outgoing communication or the received incoming communication associated with the communication identifier, wherein determining whether to complete the initiation of the outgoing communication or ignore the received incoming communication is based at least in part on analyzing the information of the displayed contact card.

19. A computer program product comprising at least one non-transitory computer-readable storage medium having computer-executable program code instructions stored therein, the computer-executable program code instructions comprising:

program code instructions for determining whether at least one communication identifier is included in contact data of an apparatus in response to determining that a communication is facilitated at least in part based on the communication identifier;

program code instructions for detecting information associated with the communication identifier, the detected information comprises data indicating whether one or more previous communications associated with the communication identifier are identified and the data comprises content specifying the details of the previous communications;

program code instructions for providing the detected information and the communication identifier to a display of the apparatus in response to initiation of an outgoing communication or receipt of an incoming communication; and program code instructions for determining whether to complete the initiation of the outgoing communication or ignore the received incoming communication based at least in part on the data associated with the previous communications.

20. The computer program product of claim 19, further comprising:

program code instructions for defining the communication identifier as unwanted corresponding to at least one contact that a user of the apparatus does not want to communicate with; and program code instructions for determining that the defined information is included in the detected information, wherein determining whether to complete further comprises determining whether to complete the initiation of the outgoing communication or ignore the received incoming communication based at least in part of the definition of the communication identifier as unwanted.

* * * * *